(12) United States Patent
Tada

(10) Patent No.: US 10,342,092 B2
(45) Date of Patent: Jul. 2, 2019

(54) LIGHT SOURCE APPARATUS AND CONTROL METHOD THEREOF

(71) Applicant: CANON KABUSHIKI KAISHA, Tokyo (JP)

(72) Inventor: Mitsuru Tada, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/890,545

(22) Filed: Feb. 7, 2018

(65) Prior Publication Data
US 2018/0235052 A1 Aug. 16, 2018

(30) Foreign Application Priority Data

Feb. 16, 2017 (JP) ................................. 2017-026912

(51) Int. Cl.
| | |
|---|---|
| G09G 3/00 | (2006.01) |
| H05B 33/08 | (2006.01) |
| H04N 9/097 | (2006.01) |
| H04N 9/76 | (2006.01) |
| H05B 37/02 | (2006.01) |
| G09G 3/34 | (2006.01) |

(52) U.S. Cl.
CPC .......... *H05B 33/0857* (2013.01); *G09G 3/00* (2013.01); *G09G 3/342* (2013.01); *G09G 3/3413* (2013.01); *H04N 9/097* (2013.01); *H04N 9/76* (2013.01); *H05B 37/0281* (2013.01); *G09G 2310/024* (2013.01)

(58) Field of Classification Search
CPC . H04N 9/097; H04N 9/30; H04N 9/76; H05B 37/0281; G09G 3/00
See application file for complete search history.

(56) References Cited

U.S. PATENT DOCUMENTS

| | | | | |
|---|---|---|---|---|
| 6,633,410 | B1 * | 10/2003 | Narushima | .......... H04N 1/6052 358/1.9 |
| 2001/0050661 | A1 * | 12/2001 | Noda | .................... G09G 3/3413 345/32 |
| 2003/0058229 | A1 * | 3/2003 | Kawabe | ................. G09G 3/342 345/204 |
| 2006/0192792 | A1 * | 8/2006 | Inazumi | ............... G09G 3/3413 345/690 |
| 2009/0051631 | A1 * | 2/2009 | Okumura | .............. G09G 3/3413 345/84 |
| 2014/0168281 | A1 * | 6/2014 | Ahn | ...................... G09G 3/3648 345/690 |

FOREIGN PATENT DOCUMENTS

JP 2007-316610 A 12/2007

* cited by examiner

*Primary Examiner* — Shaheda A Abdin
(74) *Attorney, Agent, or Firm* — Cowan, Liebowitz & Latman, P.C.

(57) ABSTRACT

A light source apparatus includes: a light source unit; and a control unit configured to perform lighting control, wherein the light source unit emits first color light at a first timing, and emits second color light at a second timing which delays after the first timing by a predetermined period, in accordance with the lighting control, and the control unit performs a plurality of times of lighting control based on the predetermined period, so that at least a part of a period in which the light source unit emits the second color light in accordance with a first lighting control overlaps with at least a part of a period, in which the light source unit emits the first color light in accordance with a second lighting control, which is performed after the first lighting control.

19 Claims, 8 Drawing Sheets

FIG. 1
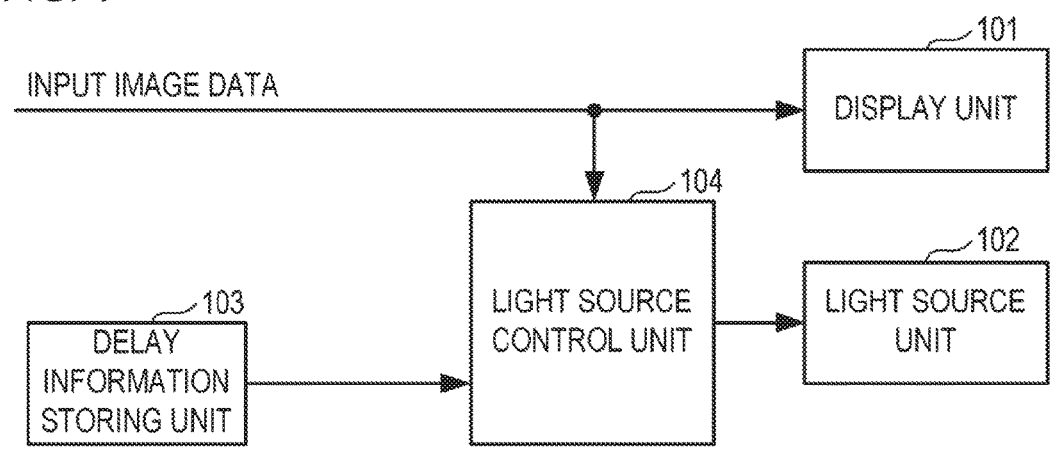
FIG. 2
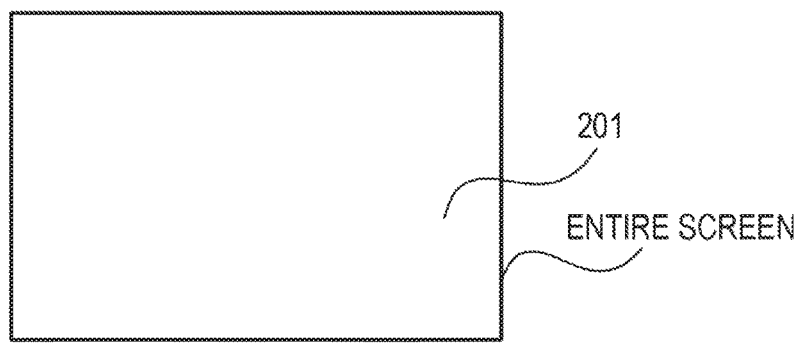
FIG. 3
| | n=0 |
|---|---|
| m=0 | 10msec |

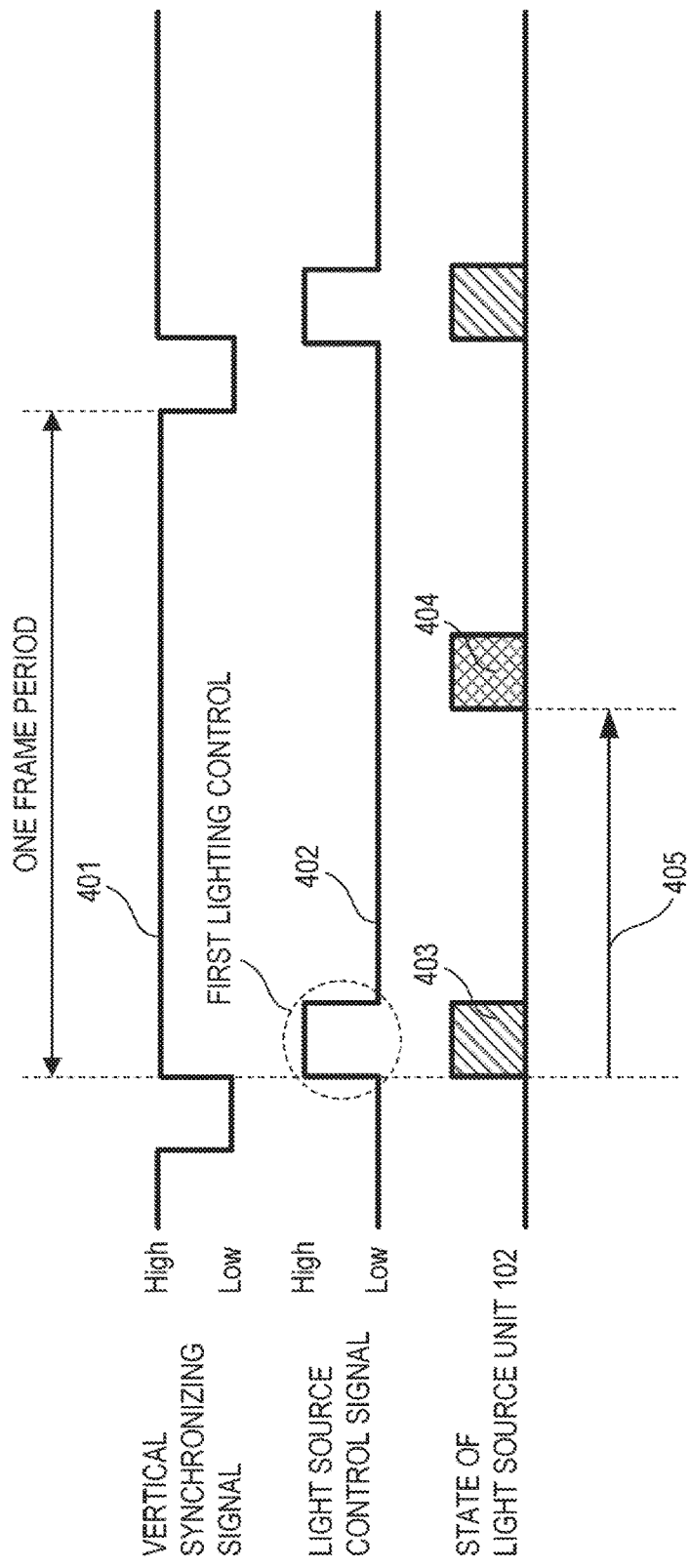

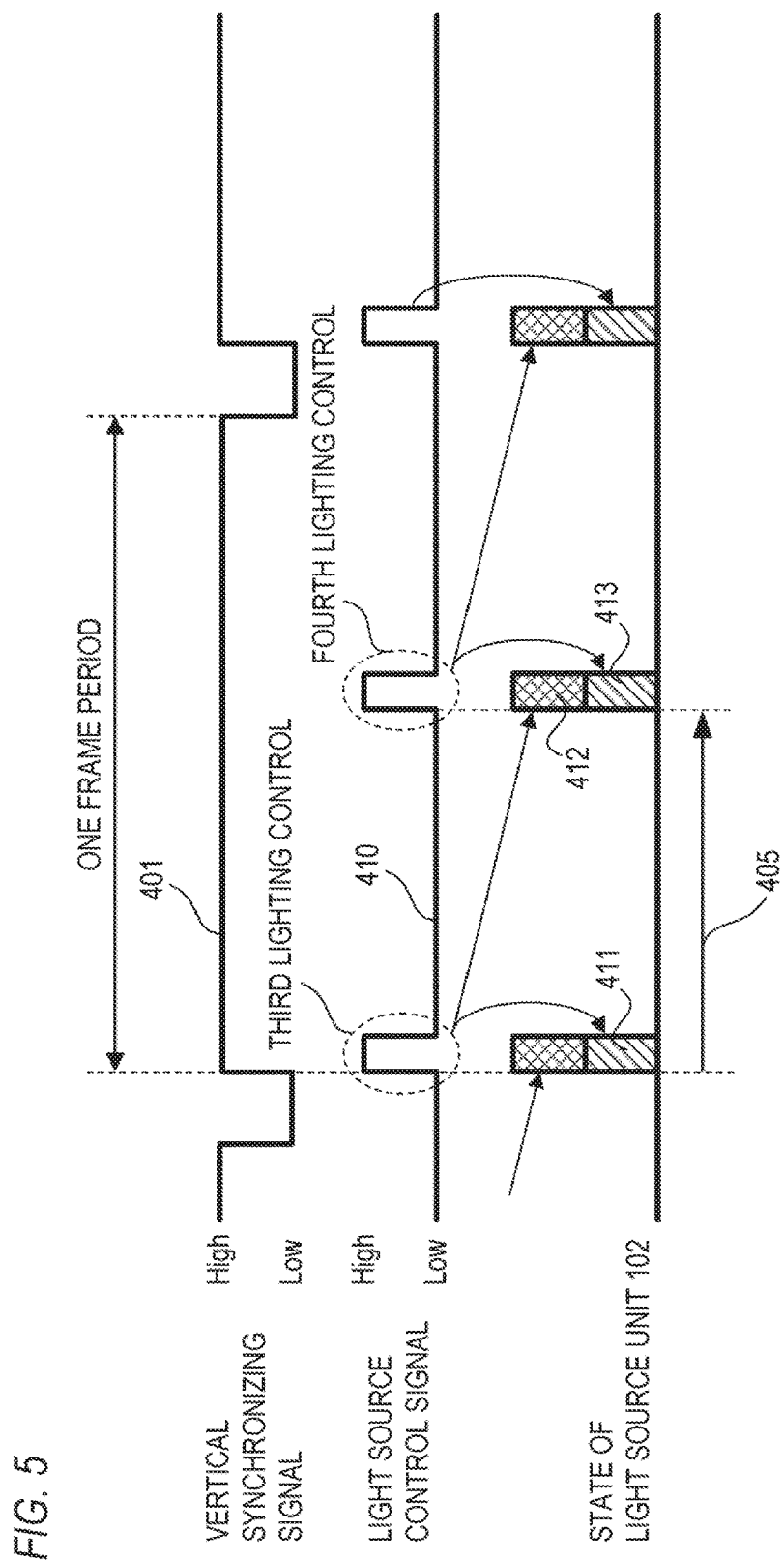

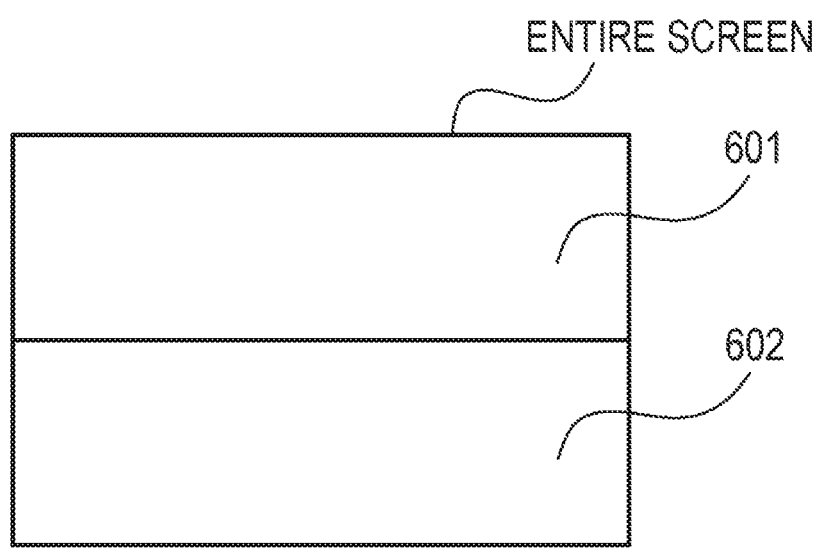

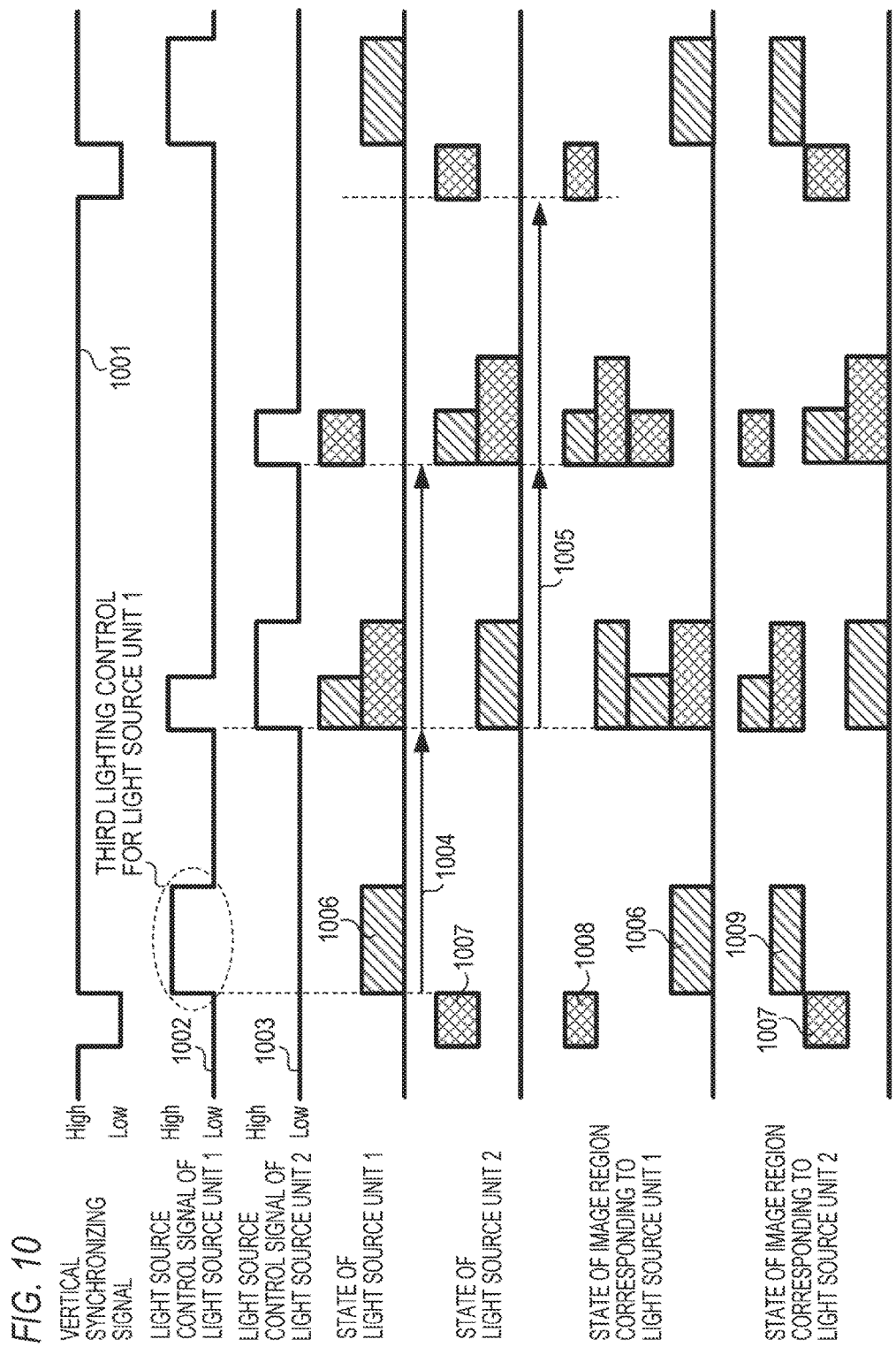

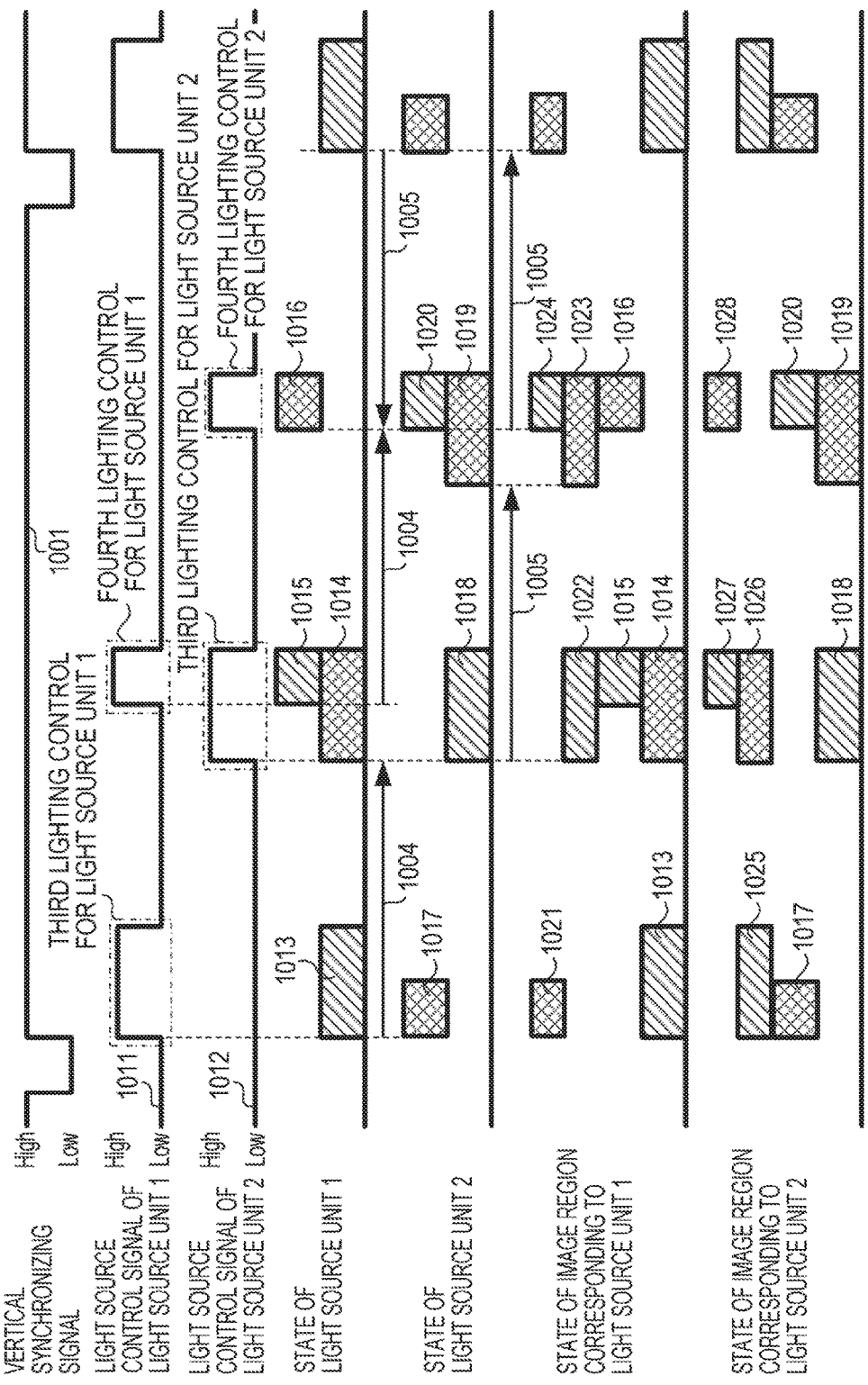

LIGHT SOURCE APPARATUS AND CONTROL METHOD THEREOF

BACKGROUND OF THE INVENTION

Field of the Invention

The present invention relates to a light source apparatus and a control method thereof.

Description of the Related Art

In the case of a display apparatus which performs hold type light emission, the tailing of a moving object may be recognized (displayed) in a moving image. The tailing of the moving object is called a "blur". As a technique to reduce the blur of a liquid crystal display apparatus, a technique to perform impulse type light emission in the backlight unit has been proposed. This technique is called a "backlight scan". In the backlight scan, a period for displaying a black image is inserted in one frame period. Therefore the backlight scan is also called a "black insertion".

As a light-emitting element (light source) of the backlight unit, a high color rendering white light emitting diode (LED) may be used. For example, the high color rendering white LED is an LED having a characteristic in which light emission of red phosphor delays from the emission of cyan phosphor. Hence, if current is supplied to the high color rendering white LED, the high color rendering white LED emits cyan color light. Then the high color rendering white LED emits the red light after emission of the cyan light with a delay. By time-integrating the cyan light and the red light, human eyes can recognize white as the emission color of the high color rendering white LED. The high color rendering white LED is also called a "delayed emission type LED".

As mentioned above, in the case of the high color rendering white LED, emission of the red light delays from the emission of the cyan light. Hence, if the backlight scan is performed in the backlight unit having the high color rendering white LED, the moving object, which is displayed in the cyan light emitting period, has a color different from the color displayed in the red light emitting period. Then by the time-integration of a plurality of different display colors, color breakup is recognized (displayed) in the moving object. In the same manner, color breakup is also generated in the case of performing the backlight scan, in which a plurality of LEDs having different emission lights emit light at mutually different timings.

A technique to control the generation of color breakup is disclosed, for example, in Japanese Patent Application Publication No. 2007-316610. According to Japanese Patent Application Publication No. 2007-316610, the light emission of two LEDs having different emission colors are controlled so that the center of the emission period of one LED matches the center of the emission period of the other LED.

SUMMARY OF THE INVENTION

However, the technique disclosed in Japanese Patent Application Publication No. 2007-316610 cannot be applied to the high color rendering white LED, in which the emission of the cyan light and the emission of the red light cannot be controlled independently. This means that color breakup, which is generated when a delayed emission type LED or the like is used, cannot be controlled using the technique disclosed in Japanese Patent Application Publication No. 2007-316610.

The present invention in its first aspect provides a light source apparatus, comprising:
a light source unit; and
a control unit configured to perform lighting control to light the light source unit, wherein
the light source unit emits first color light at a first timing, and emits second color light at a second timing which delays after the first timing by a predetermined period, in accordance with the lighting control by the control unit, and
the control unit performs a plurality of times of lighting control based on the predetermined period, so that at least a part of a period in which the light source unit emits the second color light in accordance with a first lighting control overlaps with at least a part of a period, in which the light source unit emits the first color light in accordance with a second lighting control, which is performed after the first lighting control.

The present invention in its second aspect provides a light source apparatus, comprising:
a plurality of light source units including a first light source unit and a second light source unit which is adjacent to the first light source unit; and
a control unit configured to perform, for each of the plurality of light source units, lighting control to light the light source unit, wherein
each of the plurality of light source units emits first color light at a first timing, and emits second color light at a second timing which delays after the first timing by a predetermined period, in accordance with the lighting control by the control unit, and
the control unit performs a plurality of times of lighting control for the first light source unit and a plurality of times of lighting control for the second light source unit based on the predetermined period, so that at least a part of a period in which the first light source unit emits the second color light in accordance with an M-th lighting control for the first light source unit overlaps with at least a part of a period in which the second light source unit emits the first color light in accordance with an M-th lighting control for the second light source unit.

The present invention in its third aspect provides a control method of a light source apparatus including a light source unit, the control method comprising:
lighting the light source unit, and
extinguishing the light source unit, wherein
the light source unit emits first color light at a first timing, and emits second color light at a second timing which delays after the first timing by a predetermined period, in accordance with lighting control to light the light source unit, and
a plurality of times of lighting control are performed based on the predetermined period, so that at least a part of a period in which the light source unit emits the second color light in accordance with a first lighting control overlaps with at least a part of a period, in which the light source unit emits the first color light in accordance with a second lighting control, which is performed after the first lighting control.

The present invention in its fourth aspect provides a control method of a light source apparatus including a plurality of light source units which include a first light source unit and a second light source unit which is adjacent to the first light source unit, the control method comprising:
lighting the light source unit for each of the plurality of light source units, and extinguishing the light source unit for each of the plurality of light source units, wherein each of the plurality of light source units emits first color light at a first timing, and emits second color light at a second timing which delays after the first timing by a predetermined period, in accordance with lighting control to light the light source unit, and a plurality of times of lighting control for the first light source unit and a plurality of times of lighting control for the second light source unit are performed based on the predetermined period, so that at least a part of a period in which the first light source unit emits the second color light in accordance with an M-th lighting control for the first light source unit overlaps with at least a part of a period in which the second light source unit emits the first color light in accordance with an M-th lighting control for the second light source unit.

Further features of the present invention will become apparent from the following description of exemplary embodiments with reference to the attached drawings.

BRIEF DESCRIPTION OF THE DRAWINGS

FIG. 1 is a configuration example of a display apparatus according to Example 1;

FIG. 2 is an example of a screen region according to Example 1;

FIG. 3 is an example of a delay table data according to Example 1;

FIG. 4 is an example of a control method when color breakup is generated;

FIG. 5 is an example of a control method according to Example 1;

FIG. 6 is an example of a screen region according to Example 2;

FIG. 7 is an example of a delay table data according to Example 2;

FIG. 10 is an example of a control method when color breakup is generated; and FIG. 11 is an example of a control method according to Example 3.

DESCRIPTION OF THE EMBODIMENTS

Example 1

Figure 8:
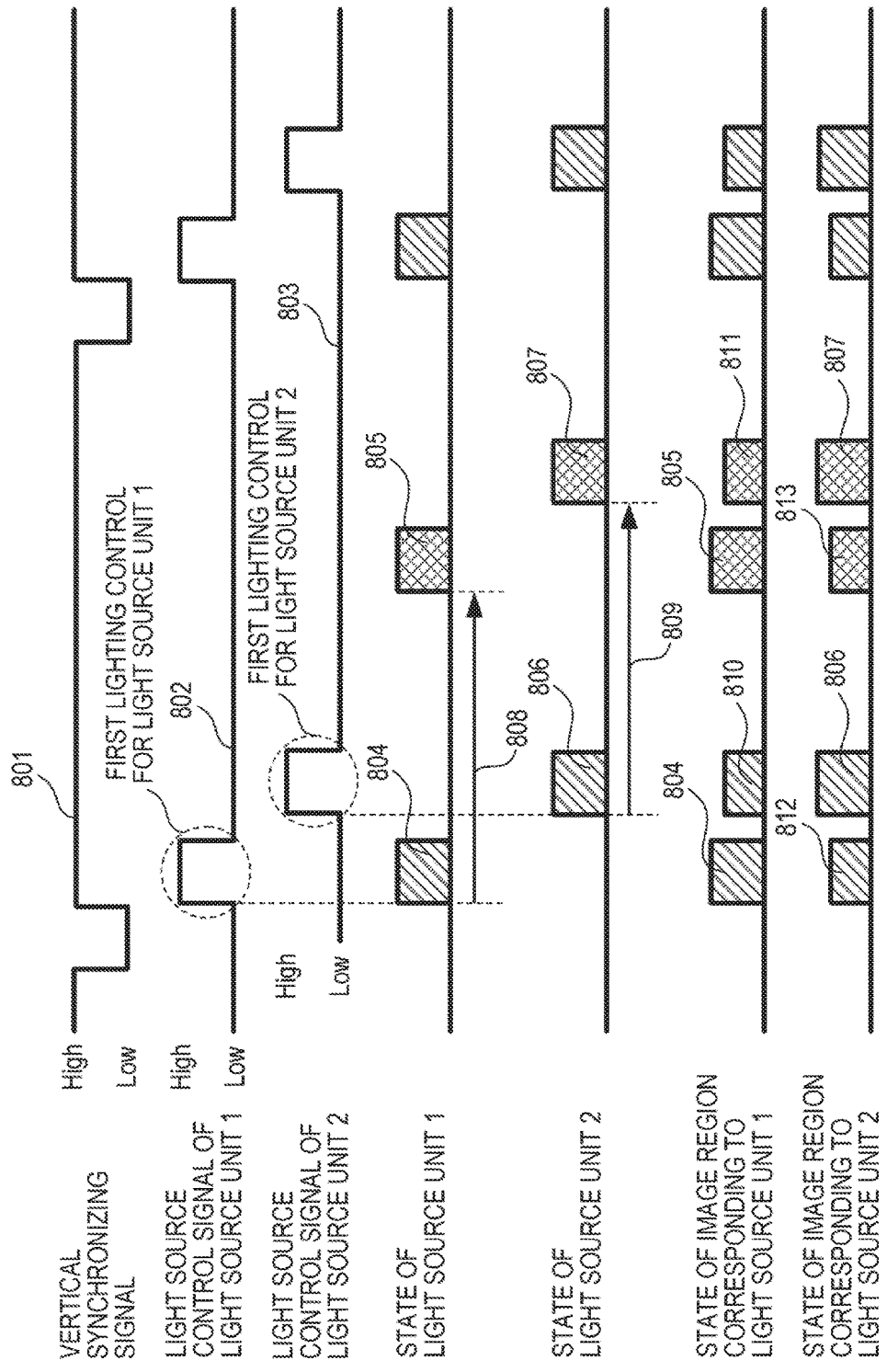
FIG. 8 is an example of a control method when color breakup is generated.

Example 1 of the present invention will be described.

A display apparatus according to this example includes: a light source unit; and a display unit which displays an image on a screen by modulating (e.g. transmitting, reflecting) the light emitted from the light source unit based on image data.

For example, the display apparatus according to this example is a transmission type liquid crystal display apparatus, a reflection type liquid crystal display apparatus or the like. In the case of a transmission type liquid crystal display apparatus, the light source unit is called a "backlight unit".

The display apparatus according to this example may be a micro electro mechanical system (MEMS) shutter type display apparatus which uses MEMS shutters instead of liquid crystal elements.

Configuration of Display Apparatus

FIG. 1 is a configuration example of the display apparatus according to this example. The display apparatus according to this example includes a display unit 101, a light source unit 102, a delay information storing unit 103 and a light source control unit 104.

The display unit 101 displays an image on the screen by modulating the light emitted from the light source unit 102 based on input image data. The input image data is image data that is inputted to the display apparatus according to this example. In concrete terms, the display unit 101 modules the light emitted from the light source unit 102 according to the image data inputted to the display unit 101. The image data acquired by performing predetermined image processing on the input image data may be inputted to the display unit 101, but in this example, it is assumed that input image data is inputted to the display unit 101. The display unit 101 is a liquid crystal panel, for example.

The light source unit 102 irradiates light to the display unit 101. For example, if the display apparatus according to this example is a transmission type liquid crystal display apparatus, the light source unit 102 irradiates light to the rear face of the display unit 101, and if the display apparatus according to this example is a reflection type liquid crystal display apparatus, the light source unit 102 irradiates light to the front face of the display unit 101. When the light source control unit 104 performs the lighting control to turn the light source unit 102 ON, the light source unit 102 emits a light of a first color at a first timing in accordance with the lighting control, and emits a light of a second color at a second timing which delays after the first timing by a predetermined period (delay time). The first color and the second color are not especially limited, but in this example, the first color and the second color correspond to two color components constituting white, respectively. In concrete terms, the first color is cyan and the second color is red. In this example, the light source unit 102 is one light-emitting element, such as a high color rendering white LED (delayed emission type LED).

FIG. 2 is an example of a screen region (region on the screen) 201 corresponding to the light source unit 102. The screen region 201 is a region of the entire screen. Therefore by controlling the light emission of the light source unit 102, the light to be irradiated from the light source unit 102 to the display unit 101 can be controlled for the entire screen, and display of the entire screen can be controlled.

The light source unit 102 may include a plurality of light-emitting elements. For example, the light source unit 102 may include two types of light-emitting elements: a light-emitting element which emits a light of a first color; and a light-emitting element which emits a light of a second color. The light source unit 102 may include a plurality of the same type of light-emitting elements. The light-emitting element is not limited to an LED. For example, an organic EL element, a laser light source, a cold cathode tube or the like may be used. The display apparatus according to this example may include a plurality of light source units.

The delay information storing unit 103 stores the delay information of the light source unit 102. The delay information of the light source unit 102 indicates the required time from the timing when the light source unit 102 emits the cyan light to the timing when the light source unit 102 emits the red light. In other words, the delay information of the light source unit 102 indicates the above mentioned delay time of the light source unit 102. For the delay information storing unit 103, a semiconductor memory, a magnetic disk, an optical disk or the like can be used. The delay information storing unit 103 may be a storage apparatus which is detachable from the display apparatus.

The format of the delay information is not especially limited, but in this example, the delay information storing unit 103 stores the delay table data, which is a table data including the delay information. FIG. 3 is an example of the delay table data according to this example. In FIG. 3, "m" denotes a vertical position (position in the vertical direction) of the light source unit, and "n" denotes a horizontal position (position in the horizontal direction) of the light source unit. In this example, the position (m, n) of the light source unit 102 is the position (0, 0). The delay time of the light source unit 102 is 10 msec. Therefore in the delay table data in FIG. 3, the delay time 10 msec is linked to the position (0, 0).

The light source control unit 104 controls the light emission of the light source unit 102. In concrete terms, the light source control unit 104 generates the light source control signal T, and outputs the generated light source control signal T to the light source unit 102. The light source unit 102 emits light according to the light source control signal T. This means that the light emission of the light source unit 102 is controlled by the light source control unit 104 controlling the light source control signal T. The timing of lighting control is not especially limited, but in this example, lighting control for the light source unit 102 is performed for a plurality of times (backlight scan: black insertion) in each frame of the input image data (more specifically, image data inputted to the display unit 101). Thereby the blur of the displayed moving image can be reduced. In this example, the light source control unit 104 reads the delay table data from the delay information storing unit 103, and controls the light emission of the light source unit 102 based on the read delay table data (delay time of the light source unit 102), which will be described in detail later. In concrete terms, the light source control unit 104 controls the light emission of the light source unit 102 based on the delay time of the light source unit 102 and the synchronizing signal (vertical synchronizing signal) of the input image data. Thereby the generation of color breakup of a moving object in the displayed moving image can be suppressed even if a delayed emission type LED or the like is used.

Color Breakup Suppression Method

An example of a method for controlling the generation of color breakup will be described with reference to FIG. 4. In the example in FIG. 4, the lighting control for the light source unit 102 is performed once in one frame period of the input image data (one period in which the vertical synchronizing signal 401 of the input image data is "High"). In concrete terms, the light source control signal 402 of the light source unit 102 is switched from "Low" to "High" at a timing when the vertical synchronizing signal 401 is switched from "Low" to "High". After the light source control signal 402="High" is maintained, the light source control signal 402 is switched from "High" to "Low". One period in which the light source control signal 402 is "High" is one lighting control period.

In the case of the example in FIG. 4, the light source unit 102 emits the cyan light in a lighting control period for the light source unit 102. In FIG. 4, the reference sign 403 indicates the cyan light emitting state when the light source unit 102 is emitting the cyan light in accordance with the first lighting control for the light source unit 102. Then at a timing after the start timing of the cyan light emitting state 403 by the delay time 405 of the light source unit 102, the light source unit 102 starts the red light emission. In FIG. 4, the reference sign 404 indicates the red light emitting state when the light source unit 102 is emitting the red light in accordance with the first lighting control for the light source unit 102.

In the case of the example in FIG. 4, the cyan light emitting period (period of the cyan light emitting state) and the red light emitting period (period of the red light emitting state) are distant from each other, hence the red light is not emitted from the light source unit 102 during the cyan light emitting period, and the cyan light is not emitted from the light source unit 102 during the red light emitting period. Therefore in the cyan light emitting period, the moving object is displayed by a color different from that in the red light emitting period. As a result, color breakup is generated in the moving object.

The control method according to Example 1 will be described next with reference to FIG. 5. In this example, the light source control unit 104 performs the lighting control for the light source unit 102 for a plurality of times in one frame period of the input image data. A number of times of the lighting control that is performed in one frame period is not especially limited, but in the case of the example in FIG. 5, the lighting control is performed twice in one frame period. Therefore in the example in FIG. 5, two periods when the light source control signal 410 of the light source unit 102 is "High" are set in one frame period. The time required for one lighting control is not especially limited, but in the case of the example in FIG. 5, which divides one lighting control period in FIG. 4 into two periods, ½ of the lighting control time in FIG. 4 is set as one lighting control time.

In FIG. 5, the reference sign 411 indicates the cyan light emitting state when the light source unit 102 is emitting the cyan light in accordance with the third lighting control for the light source unit 102. The reference sign 412 indicates the red light emitting state when the light source unit 102 is emitting the red light in accordance with the third lighting control for the light source unit 102. The reference sign 413 indicates the cyan light emitting state when the light source unit 102 is emitting the cyan light in accordance with the fourth lighting control for the light source unit 102. As FIG. 5 shows, the cyan light emitting period is exactly the same as the red light emitting period. For example, the period of the cyan light emitting state 413 is exactly the same as the red light emitting state 412. Thereby the white light, including the red light and the cyan light, can always be acquired as the light emitted from the light source unit 102. As a result, the generation of color breakup can be suppressed.

As described above, according to Example 1, the light source control unit 104 controls the light emission of the light source unit 102 so that the following Condition 1 is satisfied. Thereby the generation of color breakup can be suppressed. The method of implementing a light emission that satisfies Condition 1 is not especially limited, but in the case of the example in FIG. 5, the light source control unit 104 performs the lighting control for a plurality of times at time intervals which are approximately the same as the delay time 405 of the light source unit 102. The meaning of "approximately the same" includes "exactly the same". In concrete terms, the light source control unit 104 starts the next lighting control for the light source unit 102 at a timing after the start timing of the current lighting control for the light source unit 102 by the delay time 405.

Condition 1: At least a part of the period in which the light source unit emits first color light according to a lighting control overlaps with at least a part of the period in which the light source unit emits second color light according to another lighting control.

The start timing of the first lighting control in one frame period may deviate from the start timing in one frame period. Further, the cyan emitting period may deviate from the period of the lighting control. The red light emitting period may not be exactly the same as the cyan light emitting period.

Effect

As described above, according to Example 1, the light emission of the light source unit is controlled so that the above Condition 1 is satisfied. Thereby, even if the delayed emission type LED or the like is used, the generation of color breakup of a moving object in a displayed moving image can be suppressed.

Example 2

Example 2 of the present invention will be described. In Example 1, a case when the display apparatus has one light source unit was described. In Example 2, a case when the display apparatus has a plurality of light source units will be described. In the following, aspects (e.g. configuration, processing) different from Example 1 will be described in detail, and description on the same aspects as Example 1 will be omitted.

The configuration of the display apparatus according to Example 2 is the same as Example 1 (FIG. 1). In Example 2, however, the display apparatus has a plurality of light source units. The display unit 101 displays an image on the screen by modulating lights emitted from the plurality of light source units based on the input image data. The delay information storing unit 103 stores delay information for each of the plurality of light source units. Thereby light source control unit 104 independently controls the light emission of each of the plurality of light source units 102.

In Example 2, a plurality of screen regions (regions of the screen) correspond to a plurality of light source units respectively. In concrete terms, a plurality of divided regions constituting the region of the entire screen correspond to a plurality of light source units respectively. A number of light source units is not especially limited, but in Example 2, the display apparatus has two light source units 1 and 2, and the two light source units 1 and 2 correspond to two divided regions respectively.

FIG. 6 is an example of the two screen regions (divided regions) 601 and 602 corresponding to the two light source units 1 and 2 respectively. In Example 2, the two light source units 1 and 2 are disposed in the vertical direction. The screen region 601, which is the upper half region of the screen, corresponds to the light source unit 1, and the screen region 602, which is the lower half region of the screen, corresponds to the light source unit 2.

FIG. 7 is an example of a delay table data according to Example 2. In Example 2, the position (m, n) of the light source unit 1 is the position (0, 0), and the position (m, n) of the light source unit 2 is the position (1, 0). The delay time of the light source unit 1 and the delay time of the light source unit 2 are both 10 msec. Therefore in the delay table data in FIG. 7, the delay time 10 msec is linked to the positions (0, 0) and (1, 0). At least two light source units having different delay times may be included in the plurality of light source units.

Color Breakup Suppression Method

When the display apparatus includes a plurality of light source units, light emitted from one light source unit may leak into a screen region corresponding to another light source unit. In some cases color breakup may be generated by such a leaking of light.

An example of a method for controlling the generation of color breakup will be described first, with reference to FIG. 8. In FIG. 8, the reference sign 801 indicates the vertical synchronizing signal of the input image data, the reference sign 802 indicates the light source control signal of the light source unit 1, and the reference sign 803 indicates the light source control signal of the light source unit 2. In the example in FIG. 8, the lighting control is performed once for the light source unit 1 and once for the light source unit 2 in one frame period of the input image data. The lighting control for the light source unit 2 is performed after the lighting control for the light source unit 1 with a delay. Therefore in one frame period, the period in which the light source control signal 803 is "High" is set after the period in which the light source control signal 802 is "High".

In FIG. 8, the reference sign 804 indicates the cyan light emitting state when the light source unit 1 is emitting the cyan light in accordance with the first lighting control for the light source unit 1, and the reference sign 805 indicates the red light emitting state when the light source unit 1 is emitting the red light in accordance with the first lighting control for the light source unit 1. The reference sign 808 indicates the delay time of the light source unit 1. Therefore the start timing of the red light emitting state 805 delays from the start timing of the cyan light emitting state 804 by the delay time 808. In the same manner, the reference sign 806 indicates the cyan light emitting state when the light source unit 2 is emitting the cyan light in accordance with the first lighting control for the light source unit 2, and the reference sign 807 indicates the red light emitting state when the light source unit 2 is emitting the red light in accordance with the first lighting control for the light source unit 2. The reference sign 809 indicates the delay time of the light source unit 2. Therefore the start timing of the red light emitting state 807 delays from the start timing of the cyan light emitting state 806 by the delay time 809.

In FIG. 8, the reference sign 810 indicates the cyan light leaking state when the cyan light emitted from the light source unit 2 in the cyan light emitting state 806 is leaking into the screen region corresponding to the light source unit 1. The reference sign 811 indicates the red light leaking state when the red light emitted from the light source unit 2 in the red light emitting state 807 is leaking into the screen region corresponding to the light source unit 1. As depicted in FIG. 8, in the screen region corresponding to the light source unit 1, the period in which the cyan light is irradiated to the display unit 101 and the period in which the red light is irradiated to the display unit 101 are distant from each other. Here the period in which the cyan light is irradiated to the display unit 101 are the period in the cyan light emitting state 804 and the period in the cyan light leaking state 810. The period in which the red light is irradiated to the display unit 101 are the period in the red light emitting state 805 and the period in the red light leaking state 811. Therefore color breakup is generated in the screen region corresponding to the light source unit 1.

In the same manner, in FIG. 8, the reference sign 812 indicates a cyan light leaking state when the cyan light emitted from the light source unit 1 in the cyan light emitting state 804 is leaking into the screen region corresponding to the light source 2. The reference sign 813 indicates the red light leaking state when the red light emitted from the light source unit 1 in the red light emitting state 805 is leaking into the screen region corresponding to the light source unit 1. As depicted in FIG. 8, in the screen region corresponding to the light source unit 2, the period in which the cyan light is irradiated to the display unit 101 and the period in which the red light is irradiated to the display unit 101 are distant from each other. Here the period in which the cyan light is irradiated to the display unit 101 are the period in the cyan light emitting state 806 and the period in the cyan light leaking state 812. The periods when the red light is irradiated to the display unit 101 are the period in the red light emitting state 807, and the period in the red light leaking state 813. Therefore color breakup is generated in the screen region corresponding to the light source unit 2.

The control method according to Example 2 will be described next with reference to FIG. 9. In this example, the light source control unit 104 performs the lighting control once for the light source unit 1 and once for the light source unit 2 in one frame period of the input image data.

Figure 9:
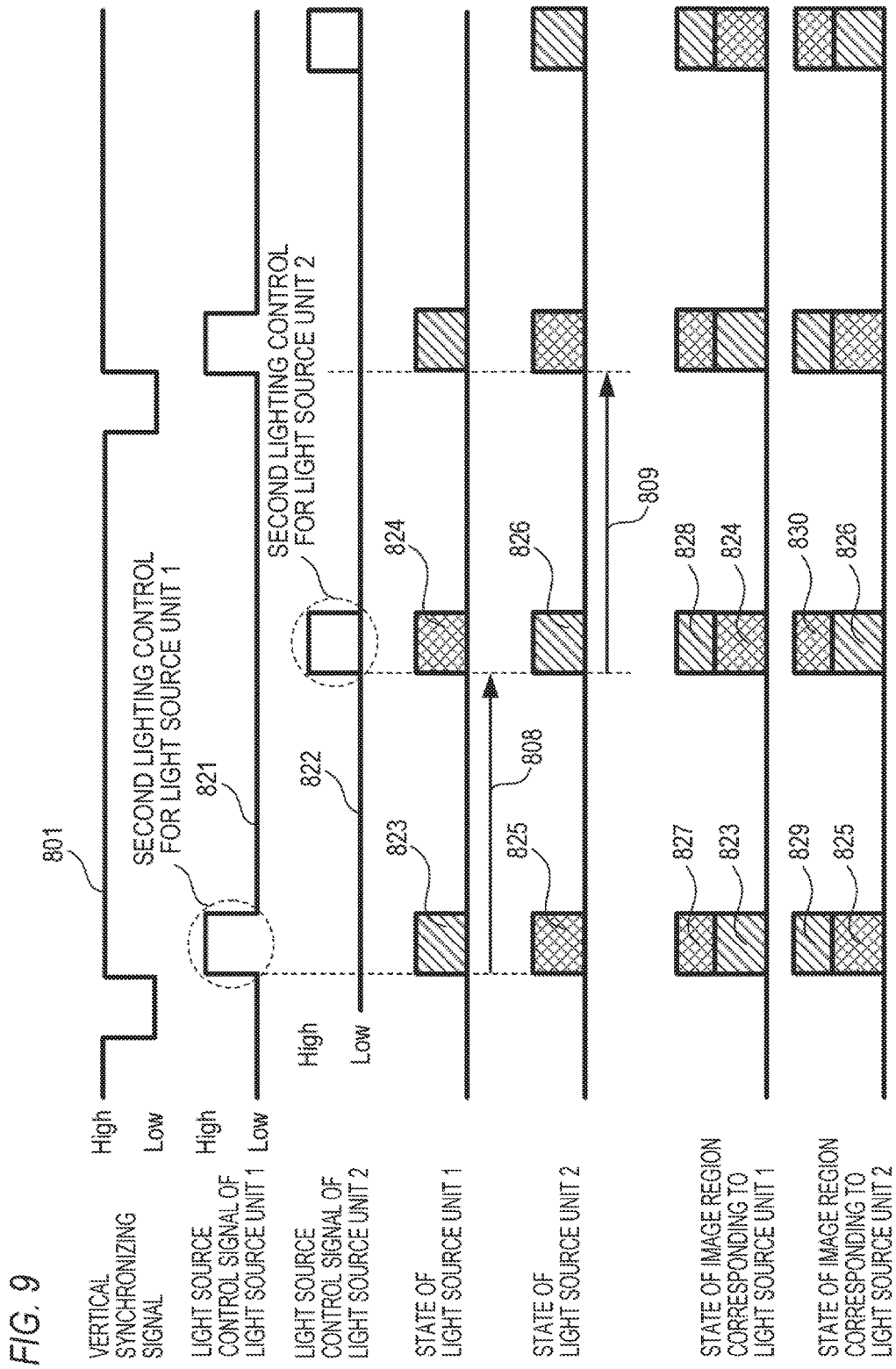
FIG. 9 is an example of a control method according to Example 2.

In FIG. 9, the reference sign 821 indicates the light source control signal for the light source unit 1, and the reference sign 822 indicates the light source control signal for the light source unit 2. The reference sign 823 indicates the cyan light emitting state when the light source unit 1 is emitting the cyan light in accordance with the second lighting control for the light source unit 1, and the reference sign 824 indicates the red light emitting state when the light source unit 1 is emitting the red light in accordance with the second lighting control for the light source unit 1. The reference sign 825 indicates the red light emitting state when the light source unit 2 is emitting the red light in accordance with the first lighting control for the light source unit 2, and the reference sign 826 indicates the cyan light emitting state when the light source unit 2 is emitting the cyan light in accordance with the second lighting control for the light source unit 2. The reference sign 827 indicates a red light leaking state when the red light emitted from the light source unit 2 in the red light emitting state 825 is leaking into the screen region corresponding to the light source unit 1. The reference sign 828 indicates a cyan light leaking state when the cyan light emitted from the light source unit 2 in the cyan light emitting state 826 is leaking into the screen region corresponding to the light source unit 1. The reference sign 829 indicates a cyan light leaking state when the cyan light emitted from the light source unit 1 in the cyan light emitting state 823 is leaking into the screen region corresponding to the light source unit 2. The reference sign 830 indicates a red light leaking state when the red light emitted from the light source unit 1 in the red light emitting state 824 is leaking into the screen region corresponding to the light source unit 2.

As depicted in FIG. 9, in the screen region corresponding to the light source unit 1, the period in which the cyan light is irradiated to the display unit 101 is exactly the same as the period in which the red light is irradiated to the display unit 101. For example, the period of the cyan light emitting state 823 is exactly the same as the period of the red light leaking state 827, and the period of the red light emitting state 824 is exactly the same as the period of the cyan light leaking state 828. Thereby for the screen region corresponding to the light source unit 1, light including the red light and the cyan light can always be acquired as the light irradiated to the display unit 101. As a result, the generation of color breakup in the screen region corresponding to the light source unit 1 can be suppressed.

In the same manner, as depicted in FIG. 9, in the screen region corresponding to the light source unit 2, the period in which the cyan light is irradiated to the display unit 101 is exactly the same as the period in which the red light is irradiated to the display unit 101. For example, the period of the red light emitting state 825 is exactly the same as the period of the cyan light leaking state 829, and the period of the cyan light emitting state 826 is exactly the same as the period of the red light leaking state 830. Thereby for the screen region corresponding to the light source unit 2, light including the red light and the cyan light can always be acquired as the light irradiated to the display unit 101. As a result, the generation of color breakup in the screen region corresponding to the light source unit 2 can be suppressed.

As described above, according to Example 2, the light source control unit 104 controls the light emission of the light source units 1 and 2 so that the following Conditions 2-1 and 2-2 are satisfied. Thereby the generation of color breakup can be suppressed. The method of implementing the light emission that satisfies the Conditions 2-1 and 2-2 is not especially limited. In the case of the example in FIG. 9, the light source control unit 104 performs the light control for the light source unit 1 for a plurality of times, and the light control for the light source unit 2 for a plurality of times, so that the time intervals between the lighting control for the light source unit 1 and the lighting control unit for the light source unit 2 approximately match the delay times 808 and 809. In concrete terms, the light source control unit 104 start the lighting control for the light source unit 2 at a timing which delays after the start timing of the lighting control for the light source unit 1 by the delay time 808. In the same manner, the light source control unit 104 starts the lighting control for the light source unit 1 at a timing which delays after the start timing of the lighting control for the light source unit 2 by the delay time 809.

Condition 2-1: At least a part of the period in which the first light source unit, out of the plurality of light source units, emits first color light, overlaps with at least a part of the period in which the second light source unit, which emits the light leaking to the screen region corresponding to the first light source unit, out of the plurality of light source units, emits second color light. Condition 2-2: At least a part of the period in which the first light source unit emits the second color light overlaps with at least a part of the period in which the second light source unit emits the first color light.

Effect

As described above, according to Example 2, the light emissions of a plurality of light source units are controlled, so that the above Conditions 2-1 and 2-2 are satisfied. Thereby when a plurality of light source units are used, the generation of color breakup of a moving object in a displayed moving image can be suppressed. Further, in Example 2, a case when the first light source unit and the second light source unit are adjacent to each other was described, but the present invention is not limited to this. In some cases, a light emitted from a light source unit, which is not adjacent to the first light source unit, may leak into the screen region corresponding to the first light source unit. In such a case, the light source unit, which is not adjacent to the first light source unit, may be used as the second light source unit.

Example 3

Example 3 of the present invention will be described next. In Example 2, a case when one lighting control is performed for each of a plurality of light source units in one frame period of the input image data was described. In Example 3, a case when a plurality of times of lighting control is performed for each of a plurality of light source units respectively in one frame period of the input image data will be described. In the following, aspects (e.g. configuration, processing) different from Example 2 will be described in detail, and description on the same aspects as Example 2 will be omitted.

Color Breakup Suppression Method

In Example 3, a predetermined number of times (at least twice) of lighting control is performed for each of a plurality of light source units respectively in one frame period of the input image data. In this case, it may be difficult to satisfy Condition 1 of Example 1, or the Conditions 2-1 and 2-2 in Example 2. This may result in the generation of color breakup.

An example of a method for controlling the generation of color breakup will be described first with reference to FIG. 10. In FIG. 10, the reference sign 1001 indicates the vertical synchronizing signal of the input image data, the reference sign 1002 indicates the light source control signal of the light source unit 1, and the reference sign 1003 indicates the light source control signal of the light source unit 2. The reference sign 1004 indicates the delay time of the light source unit 1, and the reference sign 1005 indicates the delay time of the light source unit 2.

In the example in FIG. 10, the lighting control is performed twice for the light source unit 1, and twice for the light source unit 2 in one frame unit of the input image data. Considering Condition 1 of Example 1, in one frame period, the second lighting control for the light source unit 1 is started at a timing which delays after the start timing of the first lighting control for the light source unit 1 by the delay time 1004. In the same manner, in one frame period, the second lighting control for the light source unit 2 is started at a timing which delays after the start timing of the first lighting control for the light source unit 2 by the delay time 1005. Further, considering Conditions 2-1 and 2-2 of Example 1, the lighting control for the light source unit 2 is started at a timing which delays after the start timing of the lighting control for the light source unit 1 by the delay time 1004.

In FIG. 10, the reference sign 1006 indicates the cyan light emitting state when the light source unit 1 is emitting the cyan light in accordance with the third lighting control for the light source unit 1, and the reference sign 1007 indicates the red light emitting state when the light source unit 2 is emitting the red light in accordance with the second lighting control for the light source unit 2. The reference sign 1008 indicates the red light leaking state when the red light emitted from the light source unit 2 in the red light emitting state 1007 is leaking into the screen region corresponding to the light source unit 1. The reference sign 1009 indicates the cyan light leaking state when the cyan light emitted from the light source unit 1 in the cyan light emitting state 1006 is leaking into the screen region corresponding to the light source unit 2.

As depicted in FIG. 10, in the screen region corresponding to the light source unit 1, the period in the red light leaking state 1008 does not overlap with the period in the cyan light emitting state 1006, and the red light is not irradiated to the display unit 101 in the period in the cyan light emitting state 1006. Therefore color breakup is generated in the screen region corresponding to the light source unit 1. In the same manner, in the screen region corresponding to the light source unit 2, the period in the cyan light leaking state 1009 does not overlap with the period in the red light emitting state 1007, and the cyan light is not irradiated to the display unit 101 in the period in the red light emitting state 1007, as depicted in FIG. 10. Therefore color breakup is generated in the screen region corresponding to the light source unit 2.

The control method according to Example 3 will be described with reference to FIG. 11. In this example, the light source control unit 104 performs twice for the light source unit 1, and the lighting control twice for the light source unit 2 in one frame period of the input image data.

In FIG. 11, the reference sign 1011 indicates the light source control signal for the light source unit 1, and the reference sign 1012 indicates the light source control signal for the light source unit 2. The reference sign 1013 indicates the cyan light emitting state when the light source unit 1 is emitting the cyan light in accordance with the third lighting control for the light source unit 1, and the reference sign 1014 indicates the red light emitting state when the light source unit 1 is emitting the red light in accordance with the third lighting control for the light source unit 1. The reference sign 1015 indicates the cyan light emitting state when the light source unit 1 is emitting the cyan light in accordance with the fourth lighting control for the light source unit 1, and the reference sign 1016 indicates the red light emitting state when the light source unit 1 is emitting the red light in accordance with the fourth lighting control for the light source unit 1.

The reference sign 1017 indicates the red light emitting state when the light source unit 2 is emitting the red light in accordance with the second lighting control for the light source unit 2. The reference sign 1018 indicates the cyan light emitting state when the light source unit 2 is emitting the cyan light in accordance with the third lighting control for the light source unit 2, and the reference sign 1019 indicates the red light emitting state when the light source unit 2 is emitting the red light in accordance with the third lighting control for the light source unit 2. The reference sign 1020 indicates the cyan light emitting state when the light source unit 2 is emitting the cyan light in accordance with the fourth lighting control for the light source unit 2.

The reference sign 1021 indicates the red light leaking state when the red light emitted from the light source unit 2 in the red light emitting state 1017 is leaking into the screen region corresponding to the light source unit 1. The reference sign 1022 indicates the cyan light leaking state when the cyan light emitted from the light source unit 2 in the cyan light emitting state 1018 is leaking into the screen region corresponding to the light source unit 1. The reference sign 1023 indicates the red light leaking state when the red light emitted from the light source unit 2 in the red light emitting state 1019 is leaking into the screen region corresponding to the light source unit 1. The reference sign 1024 indicates the cyan light leaking state when the cyan light emitted from the light source unit 2 in the cyan light emitting state 1020 is leaking into the screen region corresponding to the light source unit 1.

The reference sign 1025 indicates the cyan light leaking state when the cyan light emitted from the light source unit 1 in the cyan light emitting state 1013 is leaking into the screen region corresponding to the light source unit 2. The reference sign 1026 indicates the red light leaking state when the red light emitted from the light source unit 1 in the red light emitting state 1014 is leaking into the screen region corresponding to the light source unit 2. The reference sign 1027 indicates the cyan light leaking state when the cyan light emitted from the light source unit 1 in the cyan light emitting state 1015 is leaking into the screen region corresponding to the light source unit 2. The reference sign 1028 indicates the red light leaking state when the red light emitted from the light source unit 1 in the red light emitting state 1016 is leaking into the screen region corresponding to the light source unit 2.

As depicted in FIG. 11, in the screen region corresponding to the light source unit 1, at least a part of the period in which the cyan light is irradiated to the display unit 101 overlaps with at least a part of the period in which the red light is irradiated to the display unit 101. Examples of this are: the period of the cyan light emitting state 1013 overlaps with the period of the red light leaking state 1021; the period of the red light emitting state 1014 overlaps with the period of the cyan light emitting state 1015 and the period of the cyan light leaking state 1022; and the period of the red light emitting state 1016 overlaps with the period of the red light leaking state 1023 and the period of the cyan light leaking state 1024. Thereby in the screen region corresponding to the light source unit 1, the light including the red light and the cyan light can always be acquired as the light irradiated to the display unit 101. As a result, the generation of color breakup in the screen region corresponding to the light source unit 1 can be suppressed.

In the same manner, as depicted in FIG. 11, in the screen region corresponding to the light source unit 2, at least a part of the period in which the cyan light is irradiated to the display unit 101 overlaps with at least a part of the period in which the red light is irradiated to the display unit 101. Examples of this are: the period of the red light emitting state 1017 overlaps with the period of the cyan light leaking state 1025; the period of the cyan light emitting state 1018 overlaps with the period of the red light leaking state 1026 and the period of the cyan light leaking state 1027; and the period of the red light emitting state 1019 overlaps with the period of the cyan light emitting state 1020 and the period of the red light leaking state 1028. Thereby in the screen region corresponding to the light source unit 2, the light including the red light and the cyan light can always be acquired as the light irradiated to the display unit 101. As a result, the generation of color breakup in the screen region corresponding to the light source unit 2 can be suppressed.

As described above, according to Example 3, the light source control unit 104 controls the light emission of the light source units 1 and 2, so that the following Conditions 3-1 and 3-2 are satisfied. Thereby the generation of color breakup can be suppressed. The method of implementing the light emission that satisfies the Conditions 3-1 and 3-2 is not especially limited. In the case of the example in FIG. 11, the light source control unit 104 controls the light emission of the light source units 1 and 2, so that the time intervals between the lighting control for the light source unit 1 and the lighting control for the light source unit 2 approximately match the delay times 1004 and 1005. Further, the light source control unit 104 controls the light emission of the light source units 1 and 2, so that the M-th (M is an even number) lighting control for the light source unit 2 is performed at a timing which is before the start timing of the (M+1)-th lighting control for the light source unit 1 by a time approximately the same as the delay time 1005.

Condition 3-1: At least a part of the period in which the first light source unit emits first color light overlaps with at least a part of the period in which the second light source unit emits second color light. Or at least a part of the period in which the first light source unit emits the first color light in accordance with the lighting control for the first light source unit overlaps with at least a part of the period in which the first light source unit emits the second color light in accordance with another lighting control for the first light source unit.

Condition 3-2: At least a part of the period in which the first light source unit emits the second color light overlaps with at least a part of the period in which the second light source unit emits the first color light. Or at least a part of the period in which the first light source unit emits the second color light in accordance with the lighting control for the first light source unit overlaps with at least a part of the period in which the first light source unit emits the first color light in accordance with another lighting control for the first light source unit.

Effect

As described above, according to Example 3, the light emissions of a plurality of light source units are controlled so that the above Conditions 3-1 and 3-2 are satisfied. Thereby, when a plurality of light source units are used, the generation of color breakup of a moving object in a displayed moving image can be suppressed with higher certainty.

In Examples 2 and 3, in the screen region corresponding to the first light source unit, the combined light of the light emitted from the first light source unit, and the light leaking from the second light source unit, is irradiated to the display unit. Then in the screen region corresponding to the first light source unit, a combined light having a desired color (e.g. white) may not be irradiated to the display unit because of, for example, the difference between the brightness of the first color light and the brightness of the second color light. Therefore the light source control unit may control at least one of the emission (e.g. instantaneous emission intensity, lighting time) of the first light source unit and the emission of the second light source unit, so that the ratio between the first color light and the second color light in the combined light is maintained approximately constant. Thereby a combined light having a desired color can be irradiated to the display unit in the screen region corresponding to the first light source unit, and the generation of color breakup can be further suppressed. This is the same for the image region corresponding to the second light source unit.

The conditions in Examples 1 to 3 may not be satisfied, depending on the frame rate of the input image data and the like. In this case, the display apparatus may change the frame rate of the input image data, so that any one of the conditions in Examples 1 to 3 can be satisfied.

Each functional unit of Examples 1 to 3 may or may not be independent hardware. The functions of at least two functional units may be implemented by common hardware. Each of a plurality of functions of one functional unit may be implemented by independent hardware respectively. At least two functions of one functional unit may be implemented by common hardware. Each functional unit may or may not be implemented by hardware. For example, the apparatus may include a processor and a memory storing a control program. And the functions of at least a part of the functional units of the apparatus may be implemented by the processor reading the control program from the memory, and executing the program.

Examples 1 to 3 are merely examples, and a configuration obtained by appropriately modifying or changing the configurations of Examples 1 to 3 within the scope of the essential content of the present invention are also included in the present invention. A configuration obtained by appropriately combining the configurations of Examples 1 to 3 is also included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory apparatus, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-026912, filed on Feb. 16, 2017, which is hereby incorporated by reference herein in its entirety.

What is claimed is:

1. A light source apparatus, comprising:
a light source unit; and
a control unit configured to perform lighting control to light the light source unit, wherein
the light source unit emits first color light at a first timing, and emits second color light at a second timing which delays after the first timing by a predetermined period, in accordance with the lighting control by the control unit, and
the control unit performs a plurality of times of lighting control based on the predetermined period, so that at least a part of a period in which the light source unit emits the second color light in accordance with a first lighting control overlaps with at least a part of a period, in which the light source unit emits the first color light in accordance with a second lighting control, which is performed after the first lighting control.

2. The light source apparatus according to claim 1, wherein
the control unit performs the plurality of times of lighting control at time intervals approximately the same as the predetermined period.

3. The light source apparatus according to claim 1, wherein
the light source unit includes a plurality of light-emitting elements of which types are the same.

4. The light source apparatus according to claim 1, wherein
the light source unit includes a high color rendering white LED.

5. The light source apparatus according to claim 1, wherein
the first color and the second color correspond to two color components constituting white, respectively.

6. The light source apparatus according to claim 1, wherein
the first color is cyan, and the second color is red.

7. The light source apparatus according to claim 1, further comprising a display unit configured to display an image on a screen by modulating light, which is emitted from the light source unit, based on input image data, wherein
the control unit performs the plurality of times of lighting control for each frame of the input image data.

8. A light source apparatus, comprising:
a plurality of light source units including a first light source unit and a second light source unit which is adjacent to the first light source unit; and
a control unit configured to perform, for each of the plurality of light source units, lighting control to light the light source unit, wherein
each of the plurality of light source units emits first color light at a first timing, and emits second color light at a second timing which delays after the first timing by a predetermined period, in accordance with the lighting control by the control unit, and
the control unit performs a plurality of times of lighting control for the first light source unit and a plurality of times of lighting control for the second light source unit based on the predetermined period, so that at least a part of a period in which the first light source unit emits the second color light in accordance with an M-th lighting control for the first light source unit overlaps with at least a part of a period in which the second light source unit emits the first color light in accordance with an M-th lighting control for the second light source unit.

9. The light source apparatus according to claim 8, wherein
the control unit performs the plurality of times of lighting control for the first light source unit and the plurality of times of lighting control for the second light source unit, so that time intervals between the plurality of times of lighting control for the first light source unit and the plurality of times of lighting control for the second light source unit approximately match the predetermined period.

10. The light source apparatus according to claim 8, wherein
the control unit performs the plurality of times of lighting control for the first light source unit and the plurality of times of lighting control for the second light source unit, so that the M-th lighting control for the second light source unit is performed at a timing which is before a timing of an (M+1)-th lighting control for the first lighting source unit by a time that is approximately the same as the predetermined period.

11. The light source apparatus according to claim 8, wherein
the control unit performs the plurality of times of lighting control for the first light source unit and the plurality of times of lighting control for the second light source unit, so that at least a part of the period in which the first light source unit emits the second color light in accordance with the M-th lighting control for the first light source unit overlaps with: at least a part of the period in which the second light source unit emits the first color light in accordance with the M-th lighting control for the second light source unit; and at least a part of a period in which the first light source emits the first color light in accordance with an (M+1)-th lighting control for the first light source unit.

12. The light source apparatus according to claim 8, wherein
the control unit controls at least one of the lighting of the first light source unit and the lighting of the second light source unit, so that a ratio between the first color light and the second color light, in combined light generated by combining light emitted from the first light source unit and light leaking from the second light source unit, is maintained approximately constant in a region corresponding to the first light source unit.

13. The light source apparatus according to claim 8, wherein
the light source unit includes a plurality of light-emitting elements of which types are the same.

14. The light source apparatus according to claim 8, wherein
the light source unit includes a high color rendering white LED.

15. The light source apparatus according to claim 8, wherein
the first color and the second color correspond to two color components constituting white, respectively.

16. The light source apparatus according to claim 8, wherein
the first color is cyan, and the second color is red.

17. The light source apparatus according to claim 8, further comprising a display unit configured to display an image on a screen by modulating light, which is emitted from the light source unit, based on input image data, wherein
the control unit performs the plurality of times of lighting control for each frame of the input image data.

18. A control method of a light source apparatus including a light source unit, the control method comprising:
lighting the light source unit, and
extinguishing the light source unit, wherein
the light source unit emits first color light at a first timing, and emits second color light at a second timing which delays after the first timing by a predetermined period, in accordance with lighting control to light the light source unit, and
a plurality of times of lighting control are performed based on the predetermined period, so that at least a part of a period in which the light source unit emits the second color light in accordance with a first lighting control overlaps with at least a part of a period, in which the light source unit emits the first color light in accordance with a second lighting control, which is performed after the first lighting control.

19. A control method of a light source apparatus including a plurality of light source units which include a first light source unit and a second light source unit which is adjacent to the first light source unit, the control method comprising:
lighting the light source unit for each of the plurality of light source units, and
extinguishing the light source unit for each of the plurality of light source units, wherein
each of the plurality of light source units emits first color light at a first timing, and emits second color light at a second timing which delays after the first timing by a predetermined period, in accordance with lighting control to light the light source unit, and
a plurality of times of lighting control for the first light source unit and a plurality of times of lighting control for the second light source unit are performed based on the predetermined period, so that at least a part of a period in which the first light source unit emits the second color light in accordance with an M-th lighting control for the first light source unit overlaps with at least a part of a period in which the second light source unit emits the first color light in accordance with an M-th lighting control for the second light source unit.

* * * * *